United States Patent [19]
Ross et al.

[11] 3,756,631
[45] Sept. 4, 1973

[54] PIPE GASKET COLLAR
[75] Inventors: Ellis H. Ross; John F. Cairl, both of Topeka, Kans.
[73] Assignee: Ross Sand Company, Inc., Topeka, Kans.
[22] Filed: May 8, 1972
[21] Appl. No.: 251,193

[52] U.S. Cl............ 285/230, 285/236, 285/423, 285/DIG. 16
[51] Int. Cl............................................. F16l 49/00
[58] Field of Search................. 285/235, 236, 237, 285/DIG. 17, 423, DIG. 24, 230, DIG. 16; 138/118, 177, 178, 137; 277/227

[56] References Cited
UNITED STATES PATENTS
2,472,484   6/1949   Krippendorf...................... 138/125

Primary Examiner—Thomas F. Callaghan
Attorney—D. A. N. Chase

[57] ABSTRACT

A collar especially adapted to join a pair of end-to-end sections of concrete sewer or culvert pipe and to maintain a fluid seal under conditions of misalignment of the sections that may occur due to earth movement. The collar is composed of an elastomeric material and has a pair of outer bands presenting the end portions of the collar that receive the respective pipe sections. An intermediate band spans the distance between the outer bands and is integrally formed therewith to provide a one-piece, monolithic collar construction. Polyurethane rubber, for example, may be employed as the collar material. The durometer hardness value of the intermediate band is significantly less than the outer bands in order to permit the collar to flex in response to relative movement of the pipe sections to a misaligned condition. The less flexible, outer bands are secured directly to the outside surfaces of the pipe sections received therewithin, preferably by a suitable adhesive coating. A positive fluid seal is formed on the relatively rough and irregular surfaces presented by concrete pipe.

10 Claims, 4 Drawing Figures

PATENTED SEP 4 1973 3,756,631
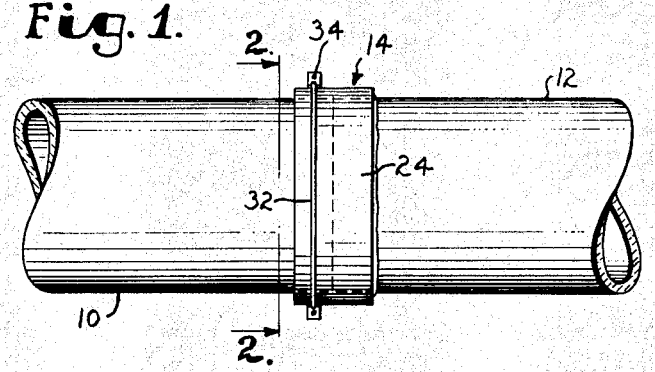
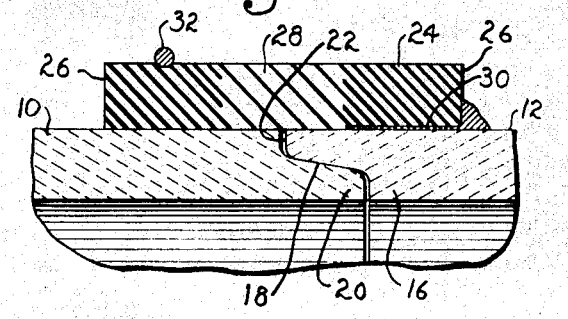
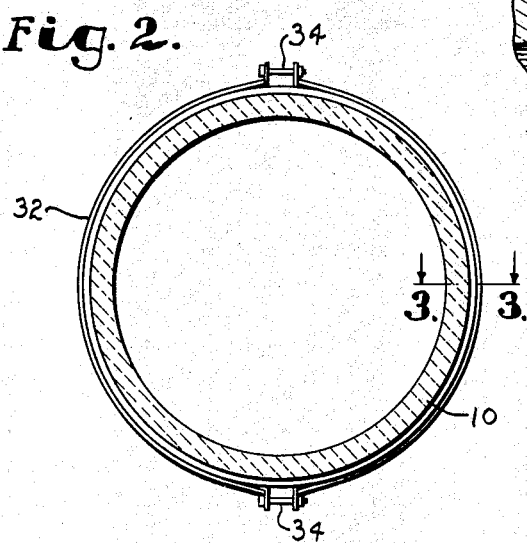
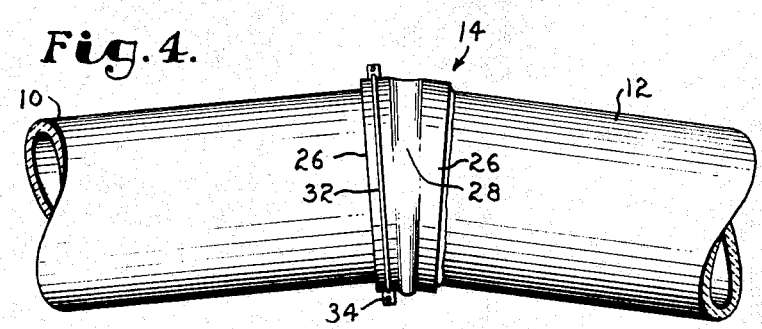

PIPE GASKET COLLAR

This invention relates to improvements in joint structures for connecting the adjacent ends of a pair of end-to-end pipe sections and, more particularly, to a collar construction capable of providing both a mechanical connection and a flexible, fluid-tight seal at the pipe joint.

Concrete pipe sections, such as used for sewer lines or culverts, have for years been joined by cementing the sections together at the tongue and groove joint provided at the mating ends. The mastic utilized provides an effective fluid seal as long as the pipe sections remain in axial alignment. However, pipes laid in the ground are inherently subject to eventual relative movement due to vibrations and settlement of the underlying earth. When this occurs, the mastic does not provide any flexibility at the joint and cracks as the pipe sections shift to positions of slight axial misalignment. Manifestly, this breaks the fluid seal and permits leakage to occur.

A number of mechanical devices have been developed heretofore for providing an expansion joint to obviate the disadvantage of cemented joints discussed above. However, oftentimes such devices have not provided the most desirable combination of cost, wearlife and ease of installation. With the ever increasing demand for pollution control, heavier duties are being imposed on sewer and drainage systems and thus the prevention of leaks by an efficient joint construction is of increasing importance.

It is, therefore, the primary object of the present invention to provide a pipe joint structure which is simple, durable, and easy to install, and which provides a flexible, fluid-tight joint as well as the necessary mechanical connection between the adjacent pipe sections.

As a corollary to the foregoing object, it is an important aim of this invention to provide a joint structure as aforesaid which employs a collar of elastomeric material that receives the adjacent ends of the pipe sections, and wherein such collar is integrally formed and yet has different durometer hardness values for the end and center portions thereof to provide a unique collar construction capable of providing both the requisite mechanical connection and a flexible fluid seal.

Still another important object of this invention is to provide a collar as aforesaid in which the end portions thereof are defined ay axially spaced bands formed integrally with an intermediate or center band of significantly increased flexibility, and wherein means is employed to secure the more rigid, outer bands to the surfaces of the respective pipe sections while permitting the intermediate band to flex in response to relative movement of the pipe sections to a misaligned condition.

Yet another object of the invention is to provide a collar as aforesaid in which such outer bands are capable of at least partially conforming to the relatively rough and irregular surface texture of concrete pipes, in order to make it possible to form a positive fluid seal simply and effectively by the use of adhesive coatings therewith and/or clamps for holding the outer bands of the collar in pressure contact with the pipe surfaces.

In the drawing:

FIG. 1 is a side elevational view showing the joint structure of the present invention in place on a pair of aligned, end-to-end pipe sections;

FIG. 2 is an enlarged, cross-sectional view taken along line 2—2 of FIG. 1;

FIG. 3 is a further enlarged, fragmentary, cross-sectional view taken along line 3—3 of FIG. 2, the thickness of the collar being exaggerated for clarity of illustration; and FIG. 4 is a view similar to FIG. 1 but showing the pipe sections in a misaligned condition to illustrate accommodation of this condition by the flexible collar construction of the joint structure of the present invention.

The adjacent ends of a pair of end-to-end pipe sections 10 and 12 are illustrated in the figures and are mechanically connected by a joint structure broadly denoted 14. Concrete pipes are illustrated of the type normally utilized in sewer lines and culverts. The pipe section 12 has a bell end 16 (FIG. 3) which presents an annular groove 18 on the inside of the bell. The other pipe section 10 is provided with a mating tongue 20 which fits into the groove 18. Note that no cement is applied to the mating tongue and groove, and preferably the adjacent pipe ends are slightly spaced from each other.

The joint structure 14 is in the nature of a collar of cylindrical configuration which is composed of an elastomeric material, either natural or synthetic. Polyurethane rubber is preferred due to its resistance to chemical attack and properties of high strength and flexibility. The collar surrounds the joint and is centered on the circular gap 22 between the sections 10 and 12, and presents a continuous, annular sidewall 24 of uniform thickness.

As is clear in FIG. 3, the collar may be considered as consisting of three sections of differing physical properties as will be explained. Such sections, however, do not constitute a structural division of the collar, in that it is molded as a one-piece, monolithic body. The outer or end sections of the collar are in the nature of a pair of axially spaced bands 26 surrounding the respective pipe sections 10 and 12. The center section is formed by an intermediate band 28 which is integral with the outer bands 26 and spans the distance therebetween, surrounding the pipes in the region of the gap 22. The intermediate band 28 is significantly more flexible than the outer bands 26, as will be explained.

The nature of the unique collar construction of the present invention is best understood by the manner in which the collar is formed. Preferably, the collar comprises a molded polyurethane rubber product formed using molding compositions that yield elastomers of two different durometer hardness values. The high durometer rubber is employed for the outer bands 26, and the lower duraometer rubber is used for the intermediate band 28. The mold is oriented with the axis of the collar vertical, and the mold is first charged with the high durometer rubber composition until it is approximately one-third full. The polyurethane reaction is permitted to proceed, and the second or center one-third of the mold is charged with the lower durometer rubber composition. The remainder of the mold is then filled with the higher durometer composition and the composite is then permitted to remain in the mold for the usual mold time so that the product may fully form. The result is the formation of discrete bands as depicted in FIG. 3, which are discrete in the sense of their physical properties of flexibility, elasticity and hardness, but are integrally formed and bonded together in their internal structures at the boundary regions at each edge of the intermediate band 28.

In underground, low pressure lines in ground where relatively slight earth movement is expected, a durometer hardness value in the range of approximately 75 to 85 is satisfactory for the outer bands 26, and 35 to 50 durometer is satisfactory for the intermediate band 28. For high pressure applications under critical earth conditions, greater rigidity of the material is required; approximately 85 to 100 durometer for the outer bands 26, and 50 to 65 durometer for the intermediate band 28.

For the low pressure applications where relatively slight earth movement is expected, a suitable cement may be simply employed to secure the outer bands 26 to the pipe sections 10 and 12. This is illustrated in FIG. 3 in connection with the pipe section 12, an adhesive coating 30 being shown bonded to the inside surface of the band 26 and the outside surface of the pipe section 12. It should be noted in this regard that the annular outside surface of the pipe section 12 is circumscribed by the band 26, and that the inside diameter of the collar would be slightly less than the outside diameter of the pipe section before the collar is slipped thereover, in order to flex the collar material somewhat in a radial direction to maintain pressure contact between the mating surfaces of the collar material and pipe section. A polyurethane cement is preferred for forming the adhesive coating 30, and is applied before the collar is slipped in place. This cement is an unreacted polyurethane rubber composition which is catalyzed just prior to application to the surfaces and then cures in place to form a fluid-tight seal. A cement of this type not only forms an excellent bond with the polyurethane collar material, but also adheres well to concrete.

It should be appreciated that the forming of a fluid-tight seal with pipe surfaces is especially difficult in those applications where concrete pipe is to be employed. Unlike steel pipe, for example, where a relatively smooth outer surface is presented, the outside surface of a concrete pipe has a relatively rough, irregular texture which renders it difficult to bring another surface into fluid-tight contact. Although the present invention may be employed with metallic pipes, it is especially suited for concrete pipe applications since a fluid-tight seal may be readily attained. This is by virtue of the flexible nature of the outer bands 26 which, although of significantly increased durometer as compared with the intermediate band 28, have sufficient flexibility and elasticity to at least partially confrom to the surface texture presented by concrete pipe sections. Thus, in conjunction with the adhesive coating 30, a positive, fluid-tight seal is formed which precludes either infiltration or exfiltration.

An alternative means of securing the outer bands 26 directly to the pipe surfaces is also shown, and comprises a clamping ring 32 provided with a pair of draw bolts 34. For purposes of illustration, the right band 26 is depicted herein secured in place with the adhesive coating 30, and the left band 26 is shown held in place by the clamping ring 32; it should be understood, however, that normally the same means of securing the collar would be employed for both ends in a given application. For underground pipes subject to low pressures and slight earth movement, the adhesive coating 30 is satisfactory. High pressure and critical earth movement conditions would require the clamping ring 32, normally in addition to the adhesive coating 30 for each band 26.

In FIG. 4 the flexibility of the joint structure 14 is illustrated. The pipe sections 10 and 12 have shifted to a condition of rather severe axial misalignment, causing the intermediate band 28 to stretch along the top of the pipe and compress at the bottom thereof. The outer bands 26, however, remain in place in fluid-tight relationship with the outer surfaces of the pipe sections 10 and 12 to maintain the integrity of the joint.

Although the dimensions of the collar of the joint structure 14 are not critical, a collar length of approximately six inches is suggested for sewer and culvert pipe. Accordingly, each of the bands 26 and 28 would have a width of approximately two inches (in some instances it may be desired to make the intermediate band 28 somewhat narrower and widen the outer bands 26). Under polyurethane rubber, a collar wall thickness of approximately one-quarter inch is satisfactory. Besides being utilized to prevent infiltration and exfiltration in sanitary and storm sewers and culverts, the joint strucutre 14 may be employed in construction, manufacturing, machinery and piping applications in general where a flexible but fluid-tight joint is required.

We claim:

1. In combination:
    a pair of end-to-end pipe sections;
    an annular collar of elastomeric material receiving adjacentends of said pipe sections therewithin with the axes of the collar and sections normally in substantial alignment,
    said collar having a pair of axially spaced outer bands presenting opposed end portions of the collar, and an intermediate band spanning the distance between said outer bands and being integral therewith to provide a one-piece, monolithic collar construction,
    said material in said intermediate band being characterized by the property of having substantially greater flexibility than the material in said outer bands,
    each of said pipe sections presenting an annular outside surface circumscribed by a portion of said intermediate band and by a corresponding outer band of said collar; and
    means securing each of said outer bands directly to said outside surface of the corresponding pipe section in fluid sealing relationship thereto, whereby said intermediate band is permitted to flex in response to relative movement of the pipe sections to a misaligned condition while the fluid seals at the outer bands are maintained.

2. In the combination as claimed in claim 1, wherein said securing means includes an adhesive coating bonded to the outside surface of one of said pipe sections and the surrounding outer band of said collar.

3. In the combination as claimed in claim 2, wherein said pipe sections are concrete thereby providing said outside surfaces thereof with a relatively rough, irregular texture, and wherein said outer bands have sufficient flexibility to at least partially conform to the texture of said surfaces.

4. In the combination as claimed in claim 1, wherein the durometer hardness value of said intermediate band is substantially less than said outer bands.

5. In the combination as claimed in claim 4, wherein said collar has a continuous, annular sidewall presenting said integral bands, and wherein the thickness of said sidewall is essentially uniform.

6. In the combination as claimed in claim 1, wherein the durometer hardness value of said intermediate band is less than approximately 65, and wherein the durometer hardness value of said outer bands is greater than approximately 75.

7. In the combination as claimed in claim 6, wherein said material is polyurethane rubber.

8. In the combination as claimed in claim 1, wherein the durometer hardness value of said intermediate band is in the range of approximately 35 to 65, and wherein the durometer hardness value of said outer bands is in the range of approximately 75 to 100.

9. In combination:
a pair of end-to-end concrete pipe sections;
an annular collar of elastomeric material receiving adjacent ends of said pipe sections therewithin with the axes of the collar and sections normally in substantial alignment,
said collar having a pair of axially spaced outer bands presenting opposed end portions of the collar, and an intermediate band spanning the distance between said outer bands and being integral therewith to provide a one-piece, monolithic collar construction,
said material in said intermediate band being characterized by the property of having substantially greater flexibility than the material in said outer bands,
each of said pipe sections presenting an annular outside surface having a relatively rough, irregular texture and circumscribed by a portion of said intermediate band and by a corresponding outer band of said collar,
said material in the outer bands having sufficient flexibility to at least partially conform to the texture of said outside surfaces; and
means securing each of said outer bands directly to the outside surface of the corresponding pipe section in fluid sealing relationship thereto, whereby said intermediate band is permitted to flex in response to relative movement of the pipe sections to a misaligned condition while the fluid seals at the outer bands are maintained,
said securing means including an adhesive coating bonded to said outside surfaces and the surrounding outer bands of said collar, and annular clamping means on said outer bands maintaining radially inwardly directed forces thereon.

10. In the combination as claimed in claim 9, wherein the durometer hardness value of said intermediate band is in the range of approximately 35 to 65, and wherein the durometer hardness value of said outer bands is in the range of approximately 75 to 100.

* * * * *